United States Patent
Shah

(10) Patent No.: US 12,517,013 B2
(45) Date of Patent: Jan. 6, 2026

(54) MISFIRE DETECTION METHOD AND CONTROL UNIT OF AN INTERNAL COMBUSTION ENGINE

(71) Applicant: Caterpillar Energy Solutions GmbH, Mannheim (DE)

(72) Inventor: Darshit Shah, Baden-Württemberg (DE)

(73) Assignee: Caterpillar Energy Solutions GmbH, Mannheim (DE)

( * ) Notice: Subject to any disclaimer, the term of this patent is extended or adjusted under 35 U.S.C. 154(b) by 322 days.

(21) Appl. No.: 18/020,388

(22) PCT Filed: Aug. 3, 2021

(86) PCT No.: PCT/EP2021/025295
§ 371 (c)(1),
(2) Date: Feb. 8, 2023

(87) PCT Pub. No.: WO2022/033716
PCT Pub. Date: Feb. 17, 2022

(65) Prior Publication Data
US 2023/0304894 A1    Sep. 28, 2023

(30) Foreign Application Priority Data
Aug. 12, 2020   (GB) ................... 2012543

(51) Int. Cl.
*G01M 15/11*     (2006.01)
*G07C 5/08*      (2006.01)
(52) U.S. Cl.
CPC .......... *G01M 15/11* (2013.01); *G07C 5/0808* (2013.01)

(58) Field of Classification Search
CPC ...... G01M 15/11; G07C 5/0808; F02D 29/06; F02D 41/1498; F02D 41/0227; F02D 41/1447; F02D 2200/1015
See application file for complete search history.

(56) References Cited

U.S. PATENT DOCUMENTS

| | | |
|---|---|---|
| 5,337,240 A | 8/1994 | Nakagawa et al. |
| 5,437,154 A | 8/1995 | Sato et al. |
| 6,371,092 B1 | 4/2002 | Guglielmo et al. |

(Continued)

FOREIGN PATENT DOCUMENTS

| | | |
|---|---|---|
| CN | 101078379 A | 11/2007 |
| DE | 102016012049 A | 4/2018 |

(Continued)

OTHER PUBLICATIONS

International Search Report related to Application No. PCT/EP2021/025295; reported on Nov. 24, 2021.

(Continued)

*Primary Examiner* — George C Jin

(57) ABSTRACT

The present invention refers to a misfire detection method for an internal combustion engine, in particular a stationary gas engine for power generation, comprising a step of determining whether the engine is subjected to an unintended performance variation and a step of detecting a misfire condition of the engine by qualifying the unintended performance variation as being caused by a misfire during operation of the engine.

14 Claims, 6 Drawing Sheets

(56) References Cited

U.S. PATENT DOCUMENTS

| | | | |
|---|---|---|---|
| 6,651,490 B1 * | 11/2003 | Ceccarani | G01M 15/11 |
| | | | 73/114.74 |
| 6,810,320 B2 | 10/2004 | Yamamoto et al. | |
| 7,540,185 B2 | 6/2009 | Lewis | |
| 7,899,608 B1 | 3/2011 | Pederson et al. | |
| 8,949,004 B2 | 2/2015 | Ishigami et al. | |
| 10,309,872 B2 | 6/2019 | Hyodo | |
| 2004/0267430 A1 | 12/2004 | Ancimer | |
| 2014/0257674 A1 | 9/2014 | Assaf et al. | |
| 2015/0315989 A1 * | 11/2015 | Andrejak | F02D 41/30 |
| | | | 123/350 |
| 2017/0089278 A1 | 3/2017 | Tulapurkar et al. | |
| 2017/0254726 A1 * | 9/2017 | Das | F02D 29/02 |
| 2022/0333539 A1 * | 10/2022 | Huber | F02D 41/0087 |

FOREIGN PATENT DOCUMENTS

| | | | |
|---|---|---|---|
| EP | 1559887 A2 | | 8/2005 |
| EP | 1978228 A1 | | 10/2008 |
| EP | 2818676 A1 | | 12/2014 |
| FR | 3081933 A1 | | 12/2019 |
| GB | 2349952 A | | 11/2000 |
| NL | 2004001 A | * | 6/2010 |

OTHER PUBLICATIONS

Great Britain Search Report related to Application No. 2012543.1; reported on Jan. 21, 2021.
European Communication pursuant to Article 94(3) EPC for Europe Patent Appln. No. 21754922.9, mailed Sep. 30, 2024 (5 pgs).

* cited by examiner

MISFIRE DETECTION METHOD AND CONTROL UNIT OF AN INTERNAL COMBUSTION ENGINE

CROSS-REFERENCE TO RELATED APPLICATION

This Application is a 35 USC §371 US National Stage filing of International Application No. PCT/EP2021/025295 filed on Aug. 3, 2021 which claims priority under the Paris Convention to Great Britain Patent Application No. 2012543.1 filed on Aug. 12, 2020.

TECHNICAL FIELD

The present invention refers to a misfire detection method for an internal combustion engine, in particular a stationary gas engine for power generation, and a control unit of an internal combustion engine for performing such a misfire detection method.

TECHNOLOGICAL BACKGROUND

For ensuring high efficiency, internal combustion engines are designed to combust an air fuel mixture within its cylinders in a timely controlled manner so as to, under ideal operating conditions, develop peak pressure in its cylinders at ideal time for maximum recovery of work from expanding gases generated upon combustion. For doing so, ignition of the air fuel mixture and propagation of a flame front within the combustion chamber has to take place according to a strictly defined pattern. However, any deviation from ideal operating conditions may lead to a less favorable combustion of the air fuel mixture and thus to a deterioration of the engine's performance and efficiency.

During operation, the engine, i.e. individual cylinders thereof, may be subjected to poor or no combustion such that no significant energy conversion takes place and thus no significant pressure and temperature rises are experienced in individual cylinders. These undesired and unintended phenomena constitute a malfunction of the engine and may generally be referred to as misfire or combusting misfire.

Combustion misfire may be caused by many different reasons. For example, a malfunction of an ignition system, i.e. a spark plug, may cause poor or no combustion in individual cylinders of the engine. Alternatively, an intake system of the engine may be subjected to a malfunction such that the air fuel mixture fed into combustion chambers of the engine has an unfavorable composition, e.g. having an air fuel ratio lying outside of a combustible range.

Besides deterioration of engine's performance and efficiency, misfire may lead unburnt fuel to enter the exhaust system of the engine. In this way, upon expelling unburnt fuel through the exhaust system into environment, misfire may contribute to damages of catalytic converters present in the exhaust system and to environmental pollution.

From the prior art, misfire detection methods are known for identifying continuous misfire conditions within individual cylinders, i.e. misfires which occur continuously among subsequent operating cycles of the engine, for example by identifying defect spark plugs of an ignition system. However, the known approaches are not suitable of detecting malfunction conditions in which poor combustion or intermittent misfire phenomena, i.e. which occur intermittently or during only a certain number of operating cycles, take place.

SUMMARY OF THE INVENTION

Starting from the prior art, it is an objective to provide an improved misfire detection method for an internal combustion engine and a control unit of an internal combustion engine for carrying out such a method.

This objective is solved by means of a misfire detection method and a control unit according to the independent claims. Preferred embodiments are set forth in the present specification, the Figures as well as the dependent claims.

Accordingly, a misfire detection method for an internal combustion engine, in particular a stationary gas engine for power generation, is provided. The method comprises a step of determining whether the engine is subjected to an unintended performance variation and a step of detecting a misfire condition of the engine by qualifying the unintended performance variation as being caused by a misfire during operation of the engine.

Furthermore, a control unit of an internal combustion engine, in particular a stationary gas engine, for misfire detection is provided. The proposed control unit is configured to perform the misfire detection method as described above. Accordingly, technical features which are described in connection with the misfire detection method in the present disclosure may also refer and be applied to the proposed control unit, and vice versa. Specifically, the control unit is configured to determine an unintended performance variation of the engine and to detect a misfire condition of the engine by qualifying the unintended performance variation as being caused by a misfire during operation of the engine.

BRIEF DESCRIPTION OF THE DRAWINGS

The present disclosure will be more readily appreciated by reference to the following detailed description when being considered in connection with the accompanying drawings in which.

DETAILED DESCRIPTION OF PREFERRED EMBODIMENTS

Figure 1:
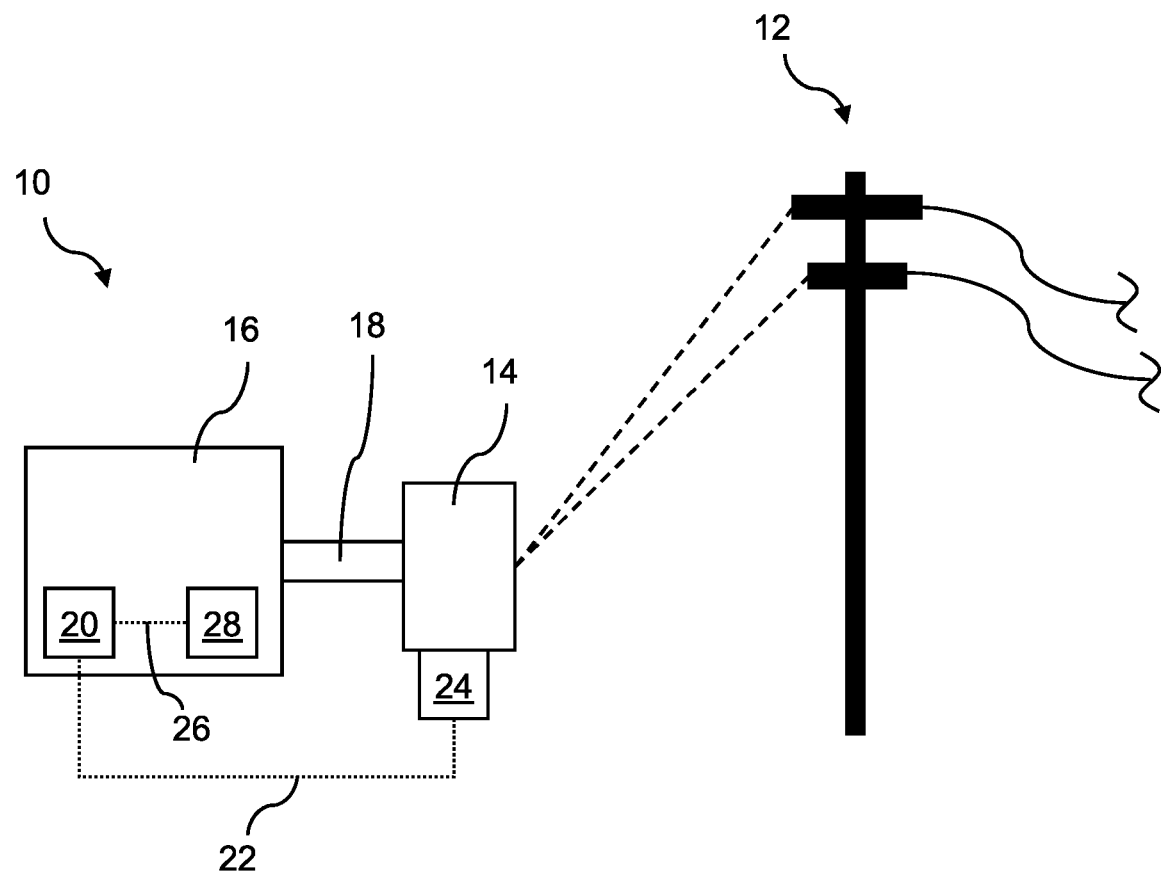
FIG. 1 schematically shows a power generation unit equipped with an internal combustion engine in the form of a stationary gas engine.

In the following, the invention will be explained in more detail with reference to the accompanying Figures. In the Figures, like elements are denoted by identical reference numerals and repeated description thereof may be omitted in order to avoid redundancies.

FIG. 1 schematically shows a power generation unit 10 for generating electric power to be provided to an electrical grid 12. The electric grid 12 may be of any suitable size and, for example, may be a decentral or national grid being connected to a plurality of power generation units, but is not limited to this configuration. Rather, in one configuration, the electric grid 12 may be provided with electric power generated by only one power generation unit. The power generation unit 10 may constitute or be part of a power plant and comprises at least one generator 14 which is driven by an internal combustion engine 16, also referred to as the "engine" in the following, to convert mechanical energy into electric power fed to the electrical grid 12. Accordingly, the generator 14 is electrically connected to the electrical grid 12 and coupled to the internal combustion engine 16 in a torque-transmitting manner. Specifically, the generator 14 is coupled to an output shaft 18 of the engine 16 such that, during operation of the engine 16, the generator 14 is actuated by the output shaft 18.

The power generation unit 10 is configured to be operated in different operating modes. Specifically, the power generation unit 10 may be operated in a grid parallel operating mode and in an island operating mode.

The grid parallel operating mode refers to a mode in which the power generation unit 10 operates in parallel with the electrical grid 12, in particular constituted by a national or local electricity distribution network, which has a much greater capacity compared to the power generation unit 10. This means that, in this mode, the individual power output by the power generation unit 10 is small compared to the load on the electrical grid 12. As a result, the frequency of power supply is to be regarded as being fixed by the electrical grid 12. In this mode, the engine 16 of the power generation unit 10 is usually operated at constant speed in dependence on the frequency set by the electrical grid 12.

The island operating mode refers to a mode in which the power generation unit 10 operates in isolation from a national or local electricity distribution network. In this mode, the engine 16 of the power generation unit 10 sets characteristics of the electrical power fed to the electrical grid 12. For example, by varying engine speed of the engine 16, the frequency of the current flowing through the electrical grid 12 may be adjusted.

The engine 16 is an internal combustion engine, in particular a reciprocating engine in the form of a stationary gas engine which is powered with a fuel air mixture of a gaseous fuel and air, for example a mixture of natural gas and air. The engine 16 preferably comprises a plurality of cylinders, e.g. eight or twelve or eighteen cylinders, which may be arranged according to an in-line engine configuration, V-configuration or any other known cylinder configuration. In one configuration, fresh air may be mixed with the fuel medium to generate the air fuel mixture before entering the combustion chambers. Alternatively, fresh air and the fuel medium may be separately supplied into and thus mixed within the combustion chambers, e.g. by means of fuel pumps injecting the fuel medium into the combustion chambers.

Each cylinder is provided with a combustion chamber delimited by a piston accommodated in the cylinder. The piston is configured for reciprocating and axial movement within the cylinder and is coupled to a crank shaft of the engine such that the reciprocating movement of the piston is transferred into rotating movement of the crank shaft.

During operation of the engine 16, the air fuel mixture is supplied to and ignited in each cylinder so as to produce high-temperature and high-pressure gases which apply forces to and thus axially move the associated pistons, thereby rotating the crank shaft and thus the output shaft 18 which is coupled thereto in a torque-transmitting manner. In this way, chemical energy, at first, is transformed into mechanical energy of the output shaft 18 which drives the generator 14 and then, by virtue of the generator 14, into electrical energy.

The engine 16 further comprises a control unit 20, also referred to as "engine control unit" or "engine control module", which is configured to control and monitor operation of the engine 16. Specifically, the control unit 20 is of an electronic control unit type and is configured to read out measurement data from a plurality of sensors monitoring a variety of engine operating parameters. Further, the control unit 20 is configured to process and interpret the thus acquired measurement data and, in response, control actuation of a plurality of engine actuators so as to set and adjust an operating point of the engine, e.g. by controlling ignition properties, such as amount and composition of air fuel mixture to be fed to and ignited in the combustion chambers, ignition timing, valve actuation and timing etc.

The basic structure and function of such an internal combustion engine 16 and its components, in particular the control unit 20, are well known to a person skilled in the art and are thus not further specified. Rather, a misfire detection method, also referred to as the "method" in the present disclosure, is addressed in the following which is interlinked with the present invention for detecting a misfire condition during operation of the engine 16.

In the context of the present disclosure, the terms "misfire condition", "misfire" or "combustion misfire" refer to any undesired and unintended deterioration of the combustion process taking place in at least one cylinder of the engine during an operating cycle which affects performance or efficiency of the engine. For example, this may be the case when no combustion or a poor combustion takes place in at least one cylinder. A poor combustion may refer to an operating cycle in which the air fuel mixture is incompletely burned and/or a flame front generated in the air fuel mixture present in a cylinder upon ignition does not propagate in a desired manner and/or combustion is not initiated at a desired timing.

The proposed method is suitable to detect different types of misfire phenomena and conditions, such as continuous, intermittent and singular misfire events. Specifically, the term "continuous misfire" refers to a malfunction condition of a cylinder in which a misfire occurs continuously, i.e. among subsequent operating cycles of the engine. The term "intermittent misfire" refers to a malfunction condition of a cylinder in which misfire occurs intermittently among subsequent operating cycles. In other words, in a cylinder affected by such a malfunction, proper operating conditions and misfire conditions may alternate. Further, the term "singular misfire" may refer to a malfunction condition of a cylinder in which misfire occurs as a single event, i.e. merely for one or multiple subsequent operating cycles of the engine.

Figure 2:
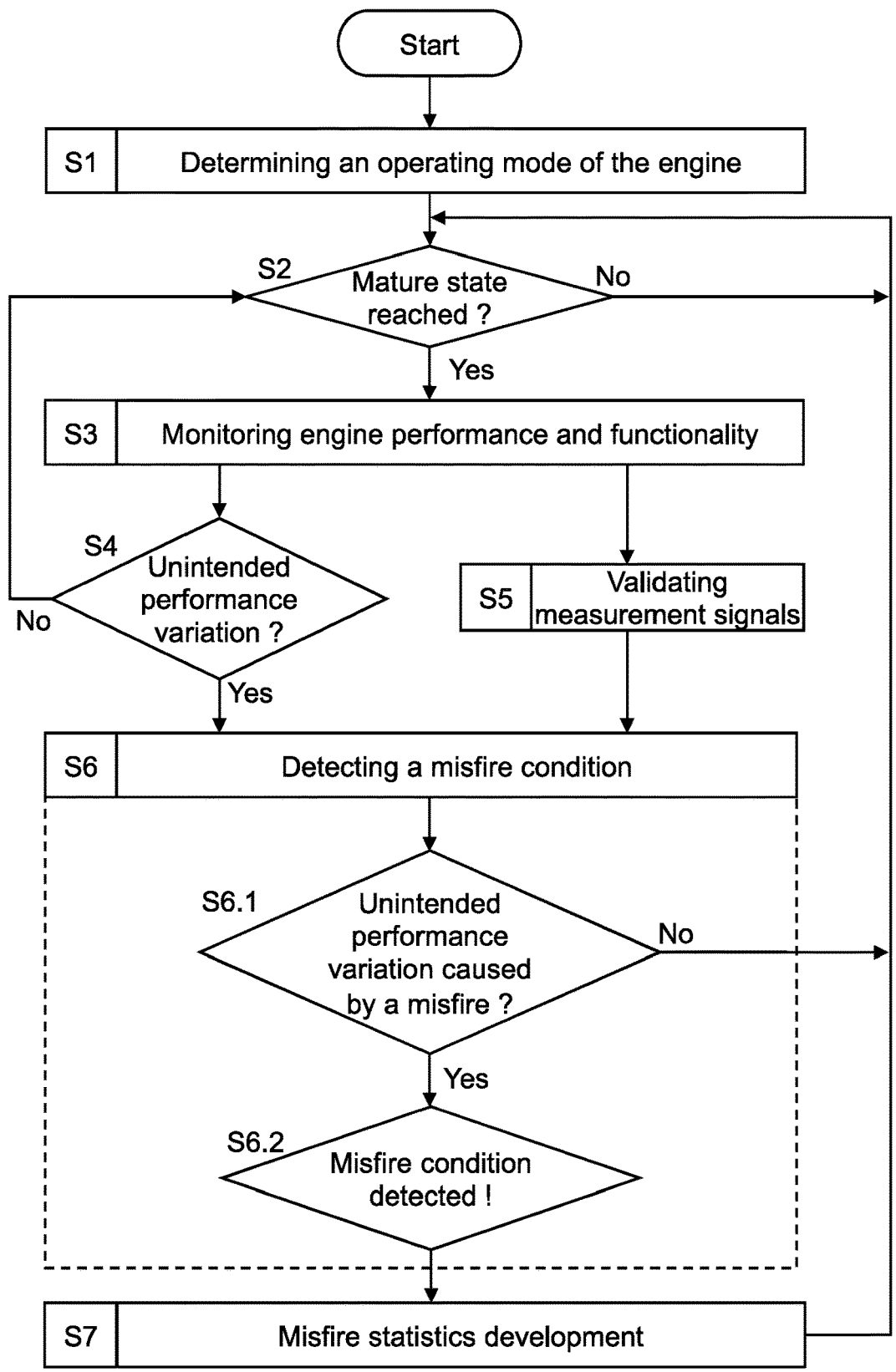
FIG. 2 schematically shows a flow diagram illustrating a misfire detection method for detecting a misfire occurring in the internal combustion engine.
Figure 3:
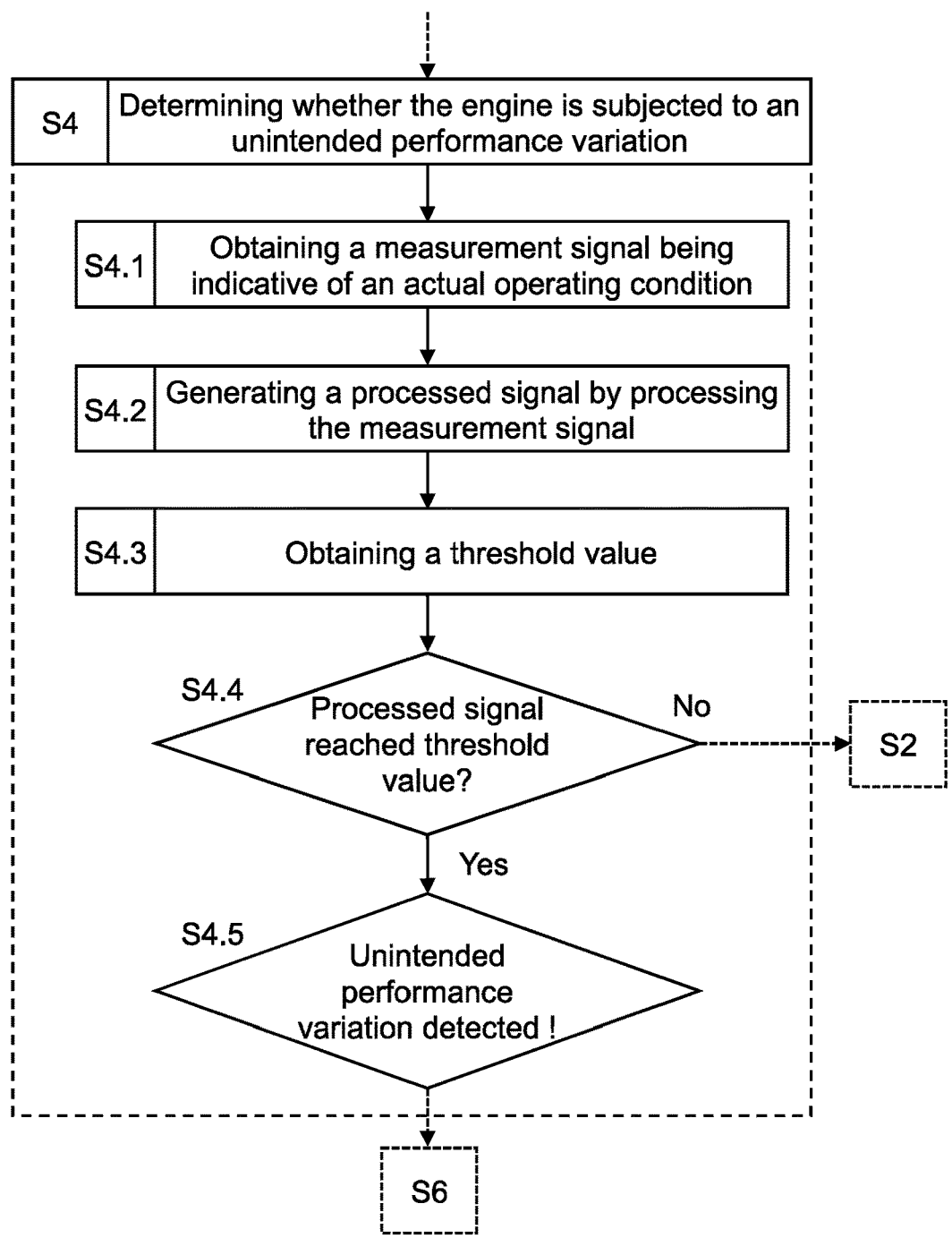
FIG. 3 schematically shows a general procedure of a step performed during the method depicted in FIG. 2 for determining whether the internal combustion engine is subjected to an unintended performance variation.

In the shown configuration, the control unit 20 is configured to carry out the misfire detection method. In the following, the misfire detection method is described under reference to FIGS. 2 to 6 which illustrate the method in the form of a flow diagram. At first, the general method is described with reference to FIG. 2 which shows an overview of the method by illustrating individual method steps and their interaction. Then, individual method steps and their underlying procedure are specified under reference to FIGS. 3 to 6.

Upon initiating the method, the control unit 20 determines in a first step S1 in which operating mode the power generation unit 10, in particular the engine 16 is operated. More specifically, the control unit 20 determines whether the power generation unit 10, in particular the engine 16 is in the grid parallel operating mode or in the island operating mode. As will be described in the following, further steps of the method, e.g. steps S4, S5 and S6, may be performed or may vary in dependence on the determined operating mode.

Thereafter, the method proceeds to step S2 from which a routine or loop constituted by method steps S2 to S7 is initiated and iterated. In the following, the routine or loop constituted by steps S2 to S7 is referred to as the "loop". The loop is run through or initiated at predetermined recurring events. This means that the loop is repetitively initiated after preset periods of times or events. Preferably, the loop is carried out during at least one operating cycle of the engine. In general, the term "operating cycle" refers to a combustion cycle of one cylinder which comprises the steps: supply the air fuel mixture into the cylinder; combusting the air fuel mixture; and discharging exhaust gases from the engine thereafter. Typically, the operating cycle is associated to one or more piston strokes within the cylinder. In one configuration, the loop may be initiated or performed for each operating cycle per cylinder.

In the step S2, the control unit 20 retrieves or determines whether the power generation unit 10, in particular the engine 16 has reached a predetermined operating state, i.e. a warmed-up or mature operating state. In this way, it may be ensured that the engine 16 has reached a stable operating point at which the engine can be run at stable conditions and at high efficiency. The predetermined operating state may further serve as a reference state of the engine 16 which allows for effectively evaluating operation thereof, i.e. whether the engine 16 is subjected to a misfire condition. The predetermined operating state may depend on the operating mode of the engine 16. In this step, the control unit 20 may monitor at least one engine operating parameter, such as engine speed, engine temperature, etc., and determine that the engine is in a mature state when at least one or each one of the at least one operating parameter has reached a predetermined threshold or lies within a predetermined range.

If it is determined that the engine 16 is not in its mature state, further execution of the loop is interrupted and the method returns to the beginning of the loop, i.e. to step S2. However, upon determining that the engine 16 is run in the predetermined operating state, i.e. the mature state, the method proceeds to a third step S3 in which the control unit 20 monitors operation of the engine 16, i.e. performance and functionality of the engine 16. For doing so, the control unit 20 receives a plurality of measurement signals being indicative of engine operating parameters.

In the context of the present disclosure, the term "engine operating parameter" refers to any parameter suitable to quantify engine performance and operation, e.g. an operating point of the engine. For example, in the shown configuration, the engine operating parameter refers to at least one of an engine speed, engine load, power output by the engine, pressure prevailing in the engine, such as intake manifold pressure, and differential pressure at a throttle valve of the engine.

Specifically, for monitoring the operational condition of the engine 16, the control unit 20 is connected to at least one sensor unit which is configured to measure engine operating parameters and to transmits measurement signals being indicative of the measured parameters to the control unit 20.

Thereafter, the method proceeds to each one of steps S4 and S5 which are carried out based on the data acquired in step S3. In the shown configuration, the steps S4 and S5 are carried out in parallel. Alternatively, these steps may be performed subsequently, i.e. one after the other, in any order. Further, Step S3 may be performed together with or in parallel to each one of steps S4 and S5.

Step S4 is provided to determine whether the engine 16 is subjected to an unintended performance variation, in particular an unintended performance drop, or not. This step refers to an associated period of time. In other words, during this step, the control unit 20 determines whether the engine 16 is experiencing or has experienced an unintended performance variation during the associated time period. For doing so, the control unit 20 analyses the data acquired during step S3 which is indicative of the engine's performance or functionality during the associated time period.

Specifically, the time period associated to step S4 may refer to one or more subsequent operating cycles of the engine 16. In other words, the step of determining whether the engine 16 is subjected to an unintended performance variation is associated to at least one operating cycle of the engine 16.

More specifically, the step S4 of determining whether the engine is subjected to an unintended performance variation is performed to determine whether an output torque of the engine unintendedly changes. Accordingly, during this step, measurement signals being indicative of the output torque of the engine 16 may be analyzed.

Figure 4:
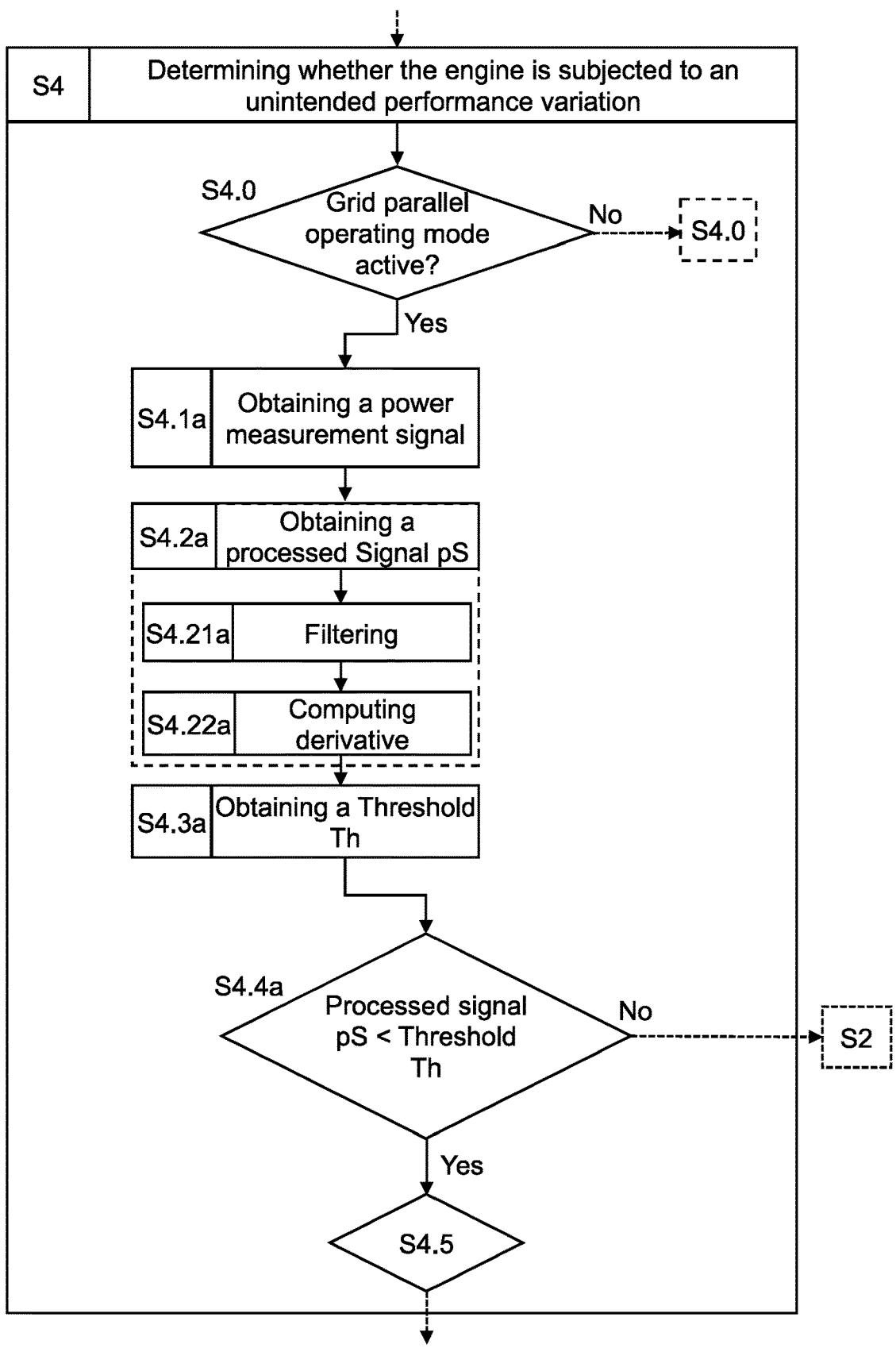
FIGS. 4 and 5 schematically show the step depicted FIG. 3 in greater detail.

The general procedure of step S4 is depicted in FIG. 4 by illustrating sub-steps S4.1 to S.4.5 and their interaction. In a first sub-step S4.1, at least one of the measurement signals received during step S3 is obtained or read out by the control unit 20. It is pointed out that step S3 and S4.1 may be carried out in or may constitute one common step.

In the shown configuration, during sub-step S4.1, the control unit 20 obtains a first measurement signal 22 being indicative of engine power, also referred to as engine performance, output by the engine 16 during operation. Specifically, the first measurement signal 22 may be indicative of an actual engine performance, i.e. an engine performance output during the associated time period or operating cycle. In other words, based on the first measurements signal 22, the actual power or performance, i.e. associated to the time period under consideration, output by the engine 16 can be derived. Accordingly, the first measurement signal 22 is also referred to as power measurement signal.

For obtaining the first measurement signal 22, the control unit 20 makes use of a first sensor unit 24 coupled to the generator 14. Specifically, the first sensor unit 24 performs current transformer measurements and potential transformer measurements at the generator 14 and based thereupon generates the first measurement signal 22 which is indicative of the actual power or performance output by the engine 16.

Further, the control unit 20 obtains a second measurement signal 26 being indicative of an engine speed, i.e. indicating a rotation frequency of the crank shaft and/or a cam shaft of the engine, in particular the number of rotations of the crank shaft and/or cam shaft per unit of time. The second measurement signal 26, also referred to as engine speed signal, is generated and transferred to the control unit 20 by means of a second sensor unit 28 which is provided in the form of at least one pick-up sensor coupled to the crank shaft and/or cam shaft.

Then, in sub-step S4.2, the control unit 20 is configured to process the received measurement signals to generate at least one processed signal. For doing so, the control unit 20 may be configured to perform at least one of the sub-steps of filtering the measurement signal, differentiating the measurement signal to compute a derivative of the measurement signal and carrying out an intensity modulation based on the measurement signal. The processing of the measurement signal may vary in dependence on the type of measurement signal and the determined operating mode. For example, in sub-step S4.2, the first measurement signal 22 may be subjected to different and/or more processing steps compared to the second measurement signal 26, and vice versa.

The at least one processed signal is provided to quantify the engine operating parameter. Specifically, the processed signal may refer to a value quantifying an average of the engine operating parameter over the associated time period. Alternatively, the processed signal may refer to a course of a value over the associated time period.

Further, in sub-step S4.3, at least on threshold associated to the at least one processed signal is obtained. In other words, for each one of the processed signal, a threshold is obtained. By doing so, the proposed method provides reference values which allow for qualitatively assessing the obtained signals and thus the operation and performance of the engine 16.

Accordingly, in sub-step S4.4, each one of the processed signals generated in sub-step S4.2 is compared with its associated threshold obtained in sub-step S4.3. If it is determined in sub-step S4.4 that none of the processed signals has reached its associated threshold, i.e. exceeds or falls below its associated threshold, the method returns to step S2. In this case, no unintended performance variation of the engine is detected. In other words, if each one of the processed signals lie within a proper range, i.e. have not reached its associated threshold, there is no indication of an unintended performance variation. This would mean that the engine 16 and thus the combustion in the cylinders works properly.

Accordingly, if it is determined that at least one of the processed signals has reached its associated threshold, i.e. exceeds or falls below its associated threshold, the method proceeds to sub-step S4.5 in which it is indicated that the engine 16 is subjected to an unintended performance variation. In other words, if at least one of the processed signals lies beyond its proper range, i.e. indicating proper operation of the engine 16, the method takes the decision that the engine 16 is subjected to an unintended performance variation. Thereafter, the method proceeds to step S6.

Figure 5:
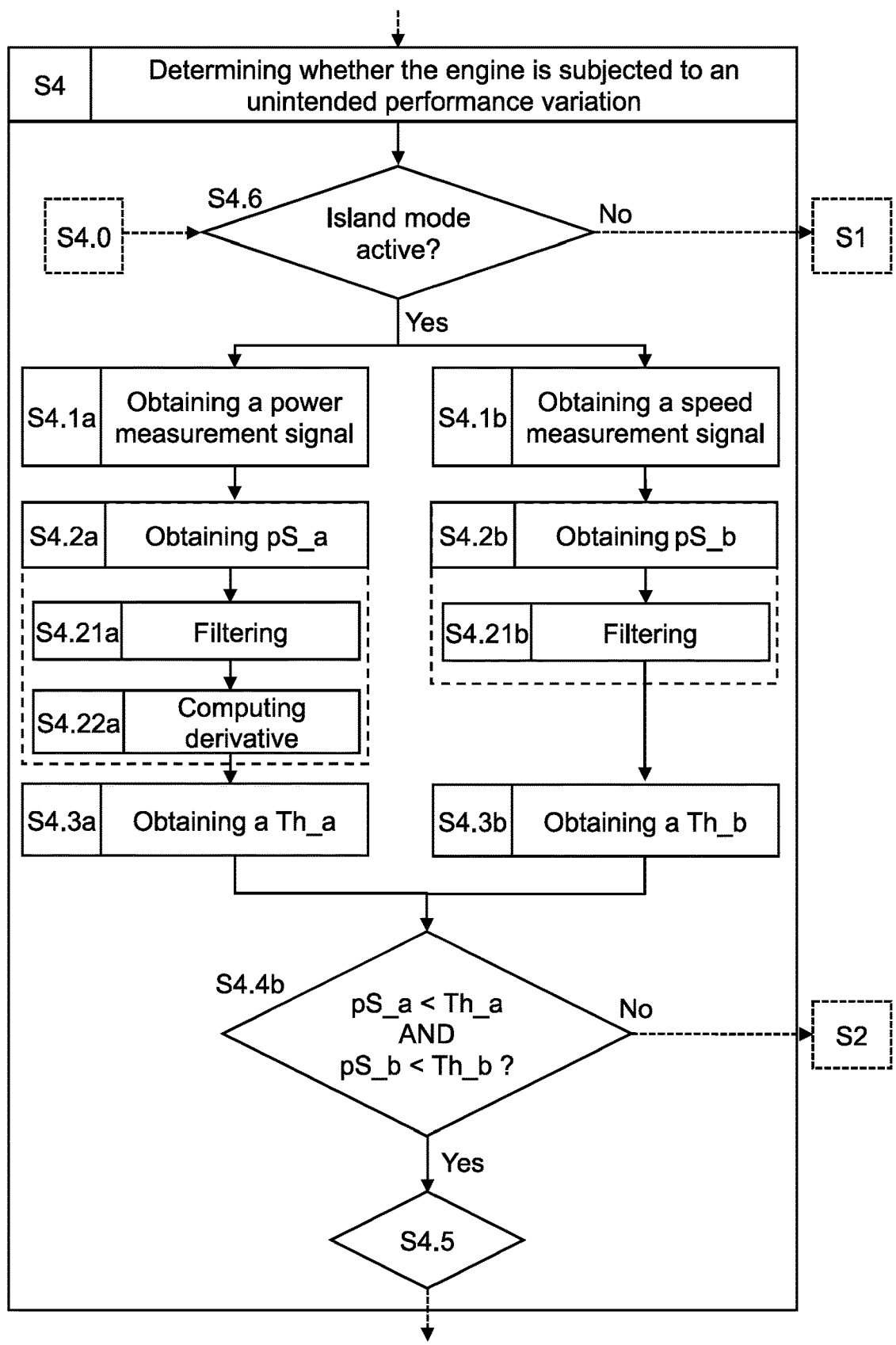

The configuration and execution of the step S4 may depend on the operating mode of the engine 16. Accordingly, in dependence on the operating mode determined in step S1, different measurement signals, different processing steps of the respective measurement signals and/or different thresholds may be provided. To illustrate this, an embodiment of the method is described in more detail by way of example under reference to FIGS. 4 and 5 in the following, wherein FIG. 4 shows the sub-steps to be performed when the engine is operated in the grid parallel operating mode and FIG. 5 shows the sub-steps to be performed when the engine 16 is operated in the island operating mode.

Specifically, in a first sub-step S4.0, it is determined whether the engine 16 is operated in the grid parallel operating mode. If this is not the case, the method proceeds to sub-step S4.6. Yet, when it is determined that the engine 16 is operated in the island operating mode, the method proceeds to step S4.1a.

In sub-step S4.1a, merely one measurement signal is obtained, i.e. the power measurement signal. In this operating mode, it has been found that it may not be required to monitor the engine speed since the supply frequency is fixed by the electrical grid 12 and therefore the engine speed is not expected to vary when the engine 16 is subjected to misfire.

Then, the power measurement signal is processed so as to generate the processed signal pS. For doing so, the control unit 20 filters the power measurement signal in step S4.21a in order to eliminate spikes and high-frequency noise from the signal. Then, in step S422a, a derivative of the thus filtered power measurement signal is computed to generate a differentiated signal. In this way, it is enabled to monitor sudden changes of the power measurement signal in the time domain.

In sub-step S4.3, a threshold Th is obtained associated with the differentiated signal which constitutes the processed signal pS before, in sub-step S4.4, the threshold is compared to the processed signal in order to evaluate whether the measurement signal is in a proper range or not. In case the processed signal pS does not reach the threshold, i.e. a maximum value of the processed signal pS during the associated time period lies below the threshold, the method proceeds to step S2, thereby indicating that the engine 16 is not subjected to an unintended performance variation and thereby no misfire condition is detected in the associated time period. Yet, if the processed signal pS has reached the threshold, i.e. the maximum value of the processed signal pS during the associated time period is equal to or exceeds the threshold, the method proceeds to step S.4.5 indicating that the engine 16 is subjected to an unintended performance variation.

In this configuration, a further step 4.23a (not shown) may be provided in which an intensity modulation may be carried out based on the differentiated signal in order to determine the magnitude of the power measurement signal changes and its form. Then, in addition to the comparison described above performed in step S4.4a, the magnitude of the power measurement signal changes is compared to a further threshold and the power measurement form is assessed. Accordingly, if the magnitude of the power measurement signal changes reaches the further threshold and/or the assessment reveals an improper power measurement signal form, the method may proceed to step S4.5.

In the following, the procedure of step S4 is described in case the engine 16 is operated in the island operating mode. Accordingly, it is determined in sub-step S4.0 that the engine is not operated in the gird parallel mode and the method proceeds to step S4.6. Then, upon determining that the engine 16 is operated in the island mode in step S4.6, the method proceeds to sub-step S41.1, i.e. to the two sub-steps S4.1a and S4.1b which are carried out in parallel. Accordingly, more than one measurement signal is obtained, cf. sub-step S41.1, processed, cf. sub-step S4.2, and compared to threshold values, cf. sub-step S4.4.

Specifically, sub-steps S4.1a to S4.3a, are performed in the same way as described above with reference to FIG. 4 to derive a first processed signal pS_a, and a first threshold Th_a. Sub-steps S4.1b to S4.3b refer to a different type of measurement signal, namely to the speed measurement signal which, in sub-step 4.1b, is obtained, before it is processed in sub-step S4.2b to generate a second processed signal pS_b by filtering the speed measurement signal.

In sub-step S4.4a, the processed signals are then compared to their associated threshold. Specifically, if the first processed signal pS_a reaches the first threshold Th_a or the second processed signal pS_b reaches the second threshold Th_b, the method proceeds to sub-step S4.5.

In the following, step S5 of validating the measurement signals acquired in step S3 is described. As can be gathered from FIG. 2, step S5 is performed in parallel to step S4. In step S5, the control unit 20 checks and validates whether the measurement signals are functional and thus whether they properly represent the operation and functionality of the engine 16. By doing so, the condition and functionality of the engine 16 as well as the sensor units employed for the method are assessed to exclude certain failure conditions which may cause or indicate an unintended performance variation of the engine, but are not related to a misfire condition. Accordingly, step S5 may also be referred to as a qualification step.

Figure 6:
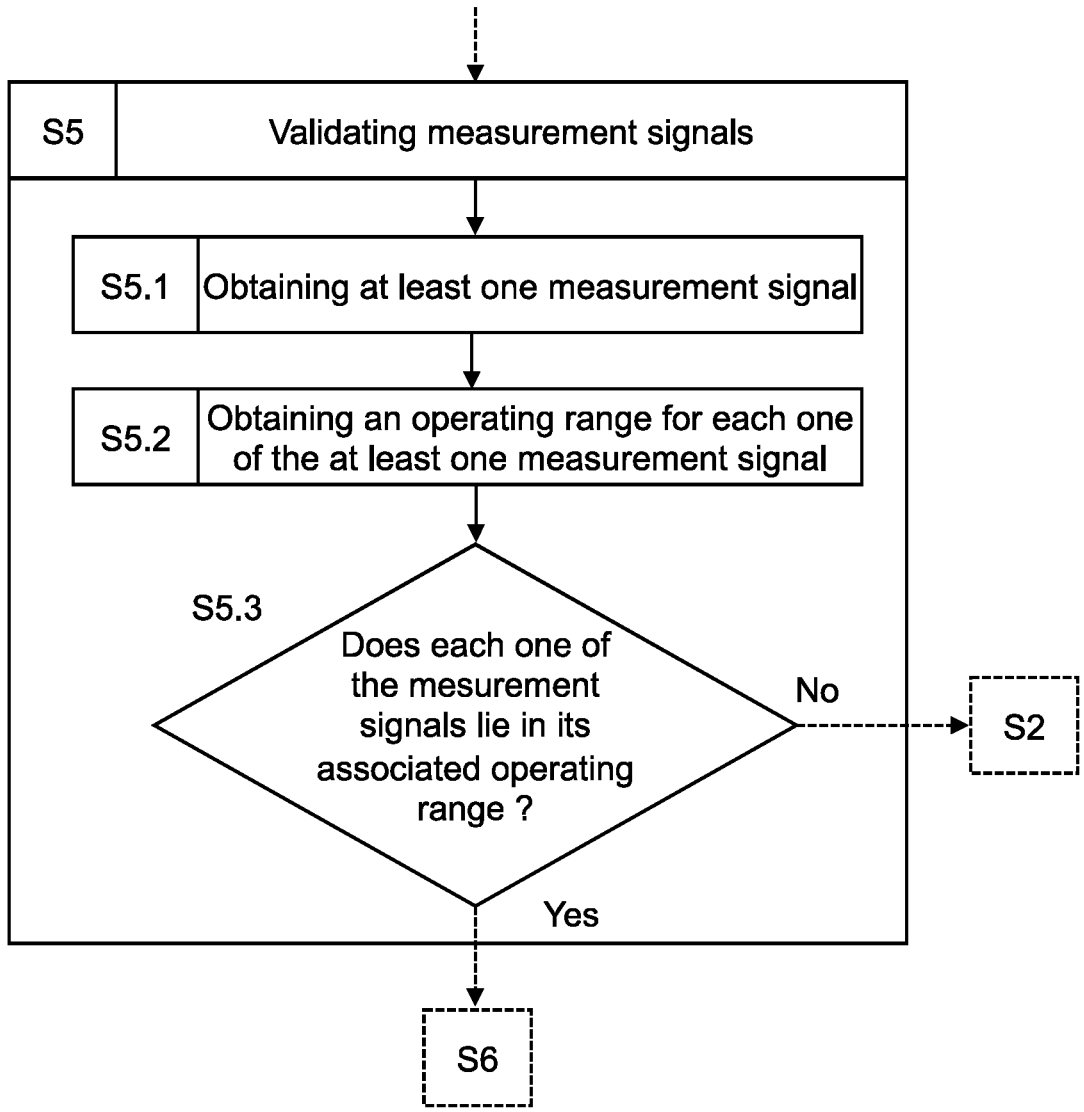
FIG. 6 schematically shows a general procedure of a step performed during the method depicted in FIG. 2 for validating measurement signals.

FIG. 6 schematically shows a general procedure carried out during step S5. In a first sub-step S5.1, the at least one measurement signal acquired during step S3 is obtained or read out by the control unit 20. Thereafter, a proper operating range for each one of the measurement signals is obtained in sub-step S5.2, before the method proceeds to sub-step S5.3. In the shown configuration, the measurement signals are constituted at least by the power measurement signal and the speed measurement signal. Further, measurement signals being indicative of an intake manifold pressure and a differential pressure at a throttle valve are further taken into account and obtained.

In sub-step S5.3, it is determined whether each one of the obtained measurement signals, in particular its values or magnitude, lies within the associated proper operating range. If this is true, the method proceeds to step S6. If not, the method returns to step S2 and may initiate further analysis or failure detection routines.

In step S6, the method detects whether the engine 16 is subjected to a failure condition, i.e. whether a misfire condition or misfire failure occurs or has occurred during the associated time period or operating cycle. For doing so, the method detects a misfire condition of the engine 16 by qualifying the unintended performance variation as being caused by a misfire during operation of the engine 16. In other words, in step S6, the unintended performance variation is brought into causal relation to a misfire malfunction to detect the misfire condition. Specifically, for doing so, the method carries out decision sub-step 6.1 in which it verifies whether an unintended performance variation is determined in step S5 and whether the measurements signals underlying the assessment are within the proper functional range. If this is not true, the method proceeds to step S2. However, if this is true, i.e. an unintended performance variation is present and the measurement signals used for the assessment are in the proper functional range, it is determined or confirmed that the unintended performance is caused by a misfire and the method proceeds to sub-step 6.2, thereby taking the decision and indicating that a misfire condition is detected.

Then, the method proceeds to step S7 of providing a misfire statistics and thus constitutes a misfire statistics development block. In this step, the occurrences of misfire are monitored during operation of the engine 16 and processed for further usage of such information. For example, in this step, the occurrences of misfire may be accumulated for a certain period time, thereby providing the functionality of a counter which indicates how frequently misfire phenomena have occurred during a certain period of time during operation of the engine 16. In this way, a misfire statistic may be provided.

The misfire statistic may be used for determining proper functionality of the engine 16 and its components, such as the ignition system, or to assess whether the engine 16 should be subjected to maintenance work or further analysis. For example, the control unit 20 may accumulate the occurrence of misfire conditions, e.g. intermittent misfire condition, occurring during operation of the engine 16 to determine an occurrence frequency indicating how often misfire occurs during operation. Further, the control unit 20 may compare the thus determined frequency with a threshold and, when the determined frequency reaches that threshold, output a signal indicating that the engine is to be subjected to maintenance work or further analysis.

All the information related to the misfire statistic may be broadcast by the control unit 20 to other components of the engine 16 or systems in or outside the power generation unit 10, e.g. via a CAN bus or Modbus or Ethernet communication link.

By the proposed method, misfire conditions occurring during operation of the engine 16 may be detected based on measurements provided by sensor units, known power generation units are already equipped with. In this way, already existing or known hardware configuration may be used for carrying out the proposed method without requiring and using additional measurement equipment, thereby providing a cost-efficient approach. Further, the proposed method allows for detecting misfire condition during operation of the engine 16, i.e. while the engine 16 is operated, thereby providing prompt feedback on the operation of the engine 16.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention.

This is in particular the case with respect to the following optional features which may be combined with some or all embodiments, items and/or features mentioned before in any technically feasible combination.

A misfire detection method for an internal combustion may comprise a step of determining whether the engine is subjected to an unintended performance variation and a step of detecting a misfire condition of the engine by qualifying the unintended performance variation as being caused by a misfire during operation of the engine.

The proposed method provides an approach according to which, at first, it may be determined whether or not an unintended performance variation has occurred during operation of the engine. This step may be performed based on hardware, known configurations are already equipped with, such as engine speed sensor or engine output power sensors. Further, this step may be performed during operation of the engine, i.e. in real-time or near real-time.

Thereafter, it may be determined whether or not the identified unintended performance variation is caused by a misfire in order to detect the occurrence of a misfire condition. This step may be performed by monitoring and analyzing the engines operating condition and functionality, in particular to validate measurements signal on which the method is based and/or to exclude malfunction conditions which are not or not likely related to misfire.

Based on this two-step approach, the method allows for providing results in real-time or near real-time, while making use of hardware, known engine configurations are already equipped with, and thus not requiring any addition measurement equipment. As a result, the proposed solution provides a cost-effective method which, in particular due to real-time measurement and misfire detection, allows for detecting the occurrence of intermittent misfire conditions.

The proposed method may be employed for misfire detection in any suitable internal combustion engine, in particular reciprocating engines. For example, the method may be employed in stationary gas engines, which in particular are used for power generation. Such gas engines may be powered with a fuel air mixture of a gaseous fuel and air, for example a mixture of natural gas and air, and may be operated in different operating modes. For example, such gas engines may be operated in a grid parallel operating mode and in an island operating mode.

The method may further comprise a step of determining an operating mode of the engine, wherein at least one of the step of determining whether the engine is subjected to an unintended performance variation and the step of detecting a misfire condition is performed in dependence on the determined operating mode. Specifically, the step of determining an operating mode of the engine may comprise determining whether or not the engine is operated in the grid parallel operating mode or the island operating mode.

The proposed method may be repetitively performed during operation of the engine. In other words, the method or some steps or subroutines constituted by at least one step thereof may be initiated or performed at predetermined time periods or events. For example, the method or some steps or subroutines thereof may be carried out or associated to at least one operating cycle of the engine or cylinders thereof. Further, the method or some steps or subroutines thereof may be initiated or carried out each operating cycle per cylinder. In one configuration, the step of determining whether the engine is subjected to an unintended performance variation is associated to at least one operating cycle of the engine. This means that the method determines whether or not an unintended performance variation occurs during the associated at least one operating cycle.

The step of determining whether the engine is subjected to an unintended performance variation may be performed to determine whether an output torque of the engine unintendedly changes, in particular unintendedly drops, during operation.

Specifically, wherein the step of determining whether the engine is subjected to an unintended performance variation comprises a sub-step of obtaining at least one measurement signal being indicative of at least one engine operating parameter.

For example, the measurement signal may be indicative of power output by the engine. For doing so, the measurement signal may be determined based on at least one of a current transformer measurement and potential transformer measurement carried out at a generator driven by the engine.

Alternatively or additionally, the measurement signal may be indicative of an engine speed. For doing so, the measurement signal may be determined based on a pick-up sensor or any other suitable sensor coupled to the crank shaft and/or cam shaft and/or output shaft of the engine and configured to acquire rotational speed.

In a further development, the step of determining whether the engine is subjected to an unintended performance variation comprises a sub-step of generating at least one processed signal by processing the at least one measurement signal. Specifically, the at least one measurement signal may be processed by applying at least one of a step of filtering the measurement signal. Alternatively or additionally, the at least one measurement signal may be processed by applying a step of computing a derivative based on the measurement signal, i.e. by computing the derivative of the measurement signal or of a filtered measurement signal. Alternatively or additionally, the at least one measurement signal may be processed by applying a step of performing an intensity modulation based on the measurement signal, i.e. by modulating the measurement signal or the filtered measurement signal or the computed derivative signal.

Further, the step of determining the unintended performance variation may comprise a sub-step of comparing the measurement signal or processed signal with a threshold value in order to determine whether the engine is subjected to an unintended performance or torque variation.

In a further development, the step of detecting the misfire condition may be provided such that measurements signals being indicative of at least one engine operating parameter are obtained and compared to a proper operating range, wherein when the measurement signal lies within the proper operating range, a misfire condition is detected.

Additionally, the method may comprise a step of providing a misfire statistic in which the occurrences of misfire conditions during operation of the engine are monitored.

Furthermore a control unit of an internal combustion in particular a stationary gas engine, for misfire detection may be provided. The control unit may be configured to determine an unintended performance variation of the engine and to detect a misfire condition of the engine by qualifying the unintended performance variation as being caused by a misfire during operation of the engine.

INDUSTRIAL APPLICABILITY

With reference to the Figures and their accompanying description, a misfire detection method for an internal combustion engine, in particular a stationary gas engine for power generation, and control unit of an internal combustion engine for carrying out the method are suggested. The method and the control unit as mentioned above are applicable in internal combustion engines provided, for example, as stationary gas engines. The suggested method may be performed in or for conventional internal combustion engines. Further, the suggested control unit may replace conventional control units and may serve as a replacement or retrofit part.

The invention claimed is:

1. A misfire detection method for a stationary internal combustion gas engine for power generation, the method comprising:
   determining an operating mode of the stationary internal combustion gas engine, wherein the operating mode corresponds to a grid parallel operating mode or an island operating mode;
   obtaining a power measurement signal of the stationary internal combustion gas engine via a power output sensor when the operating mode corresponds to the grid parallel operating mode;
   obtaining the power measurement signal and a speed measurement signal of the stationary internal combustion gas engine via the power output sensor and an engine speed sensor when the operating mode corresponds to the island operating mode;
   determining whether the engine is subjected to an unintended performance variation based on the power measurement signal when the operating mode corresponds to the grid parallel operating mode or based on the power measurement signal and the speed measurement signal when the operating mode corresponds to the island operating mode; and
   detecting a misfire condition of the engine by qualifying the unintended performance variation as being caused by a misfire during operation of the engine.

2. The method according to claim 1, wherein determining whether the engine is subjected to an unintended performance variation is associated to at least one operating cycle of the engine.

3. The method according to claim 1, wherein determining whether the engine is subjected to an unintended performance variation is performed to determine whether an output torque of the engine unintendedly changes.

4. The method according to claim 1, wherein the power measurement signal is determined based on at least one of a current transformer measurement and potential transformer measurement carried out at a generator driven by the engine.

5. The method according to claim 1, wherein determining whether the engine is subjected to an unintended performance variation comprises generating at least one processed signal by processing at least one of the power measurement signal or the speed measurement signal.

6. The method according to claim 5, wherein the power measurement signal is processed by applying at least one of a step of filtering, a step of computing a derivative and a step of performing an intensity modulation based on the power measurement signal.

7. The method according to claim 6, wherein determining the unintended performance variation comprises comparing at least one of the power measurement signal or the processed power measurement signal with a threshold value in order to determine whether the engine is subjected to an unintended performance variation.

8. The method according to claim 1, wherein detecting the misfire condition includes comparing at least one of the power measurement signal or the speed measurement signal to a proper operating range, wherein when the at least one of the power measurement signal or the speed measurement signal lies within the proper operating range, a misfire condition is detected.

9. The method according to claim 1, further comprising providing a misfire statistic in which occurrences of misfire conditions during operation of the engine are monitored.

10. A control unit for misfire detection of a stationary internal combustion gas engine, which communicates with a power output sensor and an engine speed sensor, wherein the control unit is configured to:
    determine an operating mode of the stationary internal combustion gas engine, wherein the operating mode corresponds to a grid parallel operating mode or an island operating mode;
    obtain a power measurement signal of the stationary internal combustion gas engine via the power output sensor when the operating mode corresponds to the grid parallel operating mode;
    obtaining the power measurement signal and a speed measurement signal of the stationary internal combustion gas engine via the power output sensor and the engine speed sensor when the operating mode corresponds to the island operating mode;
    determine an unintended performance variation of the engine based on the power measurement signal when the operating mode corresponds to the grid parallel operating mode or based on the power measurement signal and the speed measurement signal when the operating mode corresponds to the island operating mode; and
    detect a misfire condition of the engine by qualifying the unintended performance variation as being caused by a misfire during operation of the engine.

11. The control unit of claim 10, wherein the control unit is further configured to:
    process the power measurement signal by applying a filtering process, computing a derivative, and performing an intensity modulation based on the power measurement signal.

12. The control unit of claim 11, wherein the control unit is further configured to:
    determine the unintended performance variation based, at least in part, on comparing at least one of the power measurement signal or the processed power measurement signal to a threshold value in order to determine whether the engine is subjected to an unintended performance variation.

13. The control unit of claim 10, wherein the control unit is further configured to:
    detect the misfire condition based, at least in part, on comparing at least one of the power measurement signal or the speed measurement signal to a proper operating range, wherein when the at least one of the power measurement signal or the speed measurement signal lies within the proper operating range, a misfire condition is detected.

14. The control unit of claim 10, wherein the control unit is further configured to:
    provide a misfire statistic in which occurrences of misfire conditions during operation of the engine are monitored.

* * * * *